US010294885B2

(12) United States Patent
Bettini Rabello et al.

(10) Patent No.: US 10,294,885 B2
(45) Date of Patent: May 21, 2019

(54) CYLINDER LINER FOR AN INTERNAL COMBUSTION ENGINE

(71) Applicants: Mahle Metal Leve S/A, Jundiaí (BR); Mahle International GmbH, Stuttgart (DE)

(72) Inventors: Rafael Bettini Rabello, Jundiaí (BR); Edney Deschauer Rejowski, Jundiaí (BR)

(73) Assignees: Mahle Metal Leve S/A (BR); Mahle International GmbH (DE)

( * ) Notice: Subject to any disclaimer, the term of this patent is extended or adjusted under 35 U.S.C. 154(b) by 159 days.

(21) Appl. No.: 15/378,186

(22) Filed: Dec. 14, 2016

(65) Prior Publication Data

US 2017/0167430 A1 Jun. 15, 2017

(30) Foreign Application Priority Data

Dec. 15, 2015 (BR) ............................ 102015031391

(51) Int. Cl.

*F02F 1/00* (2006.01)
*F02F 1/16* (2006.01)
*F02F 1/20* (2006.01)
*F16J 10/04* (2006.01)

(52) U.S. Cl.

CPC ................ *F02F 1/004* (2013.01); *F02F 1/16* (2013.01); *F02F 1/20* (2013.01); *F16J 10/04* (2013.01)

(58) Field of Classification Search

CPC ...... F02F 1/004; F02F 1/08; F02F 1/16; F02F 2200/00; F02F 1/20; C23C 4/134; C23C 4/18; B24B 33/02; F16J 10/04

See application file for complete search history.

(56) References Cited

U.S. PATENT DOCUMENTS 5,630,953 A * 5/1997 Klink ................. B23K 26/0084 219/121.69
5,701,861 A * 12/1997 Hegemier ............... B24B 33/02 123/193.2
2013/0220113 A1 8/2013 Kim
2014/0182540 A1 7/2014 Johansson

FOREIGN PATENT DOCUMENTS

DE 4316012 A1 11/1994
JP 2004176556 A 6/2004
JP 2012051057 A 3/2012
WO WO-2015/010178 A1 1/2015

OTHER PUBLICATIONS

English abstract for JP-2004176556.
English abstract for JP-2012051057.
European Search Report for EP-16203511.
English abstract for WO-2015010178.

* cited by examiner

*Primary Examiner* — Jacob M Amick

(74) *Attorney, Agent, or Firm* — Fishman Stewart PLLC

(57) ABSTRACT

A cylinder liner for an internal combustion engine may include a hollow cylindrical body. The body may include an internal surface having a longitudinal/axial length. The internal surface may be divided into at least two portions along the longitudinal/axial length. The at least two portions may respectively include a specific value of roughness and a predefined length.

18 Claims, 2 Drawing Sheets

CYLINDER LINER FOR AN INTERNAL COMBUSTION ENGINE

CROSS-REFERENCE TO RELATED APPLICATIONS

This application claims priority to Brazilian Patent Application No. 10 2015 031391 8, filed Dec. 15, 2015, the contents of which are hereby incorporated by reference in its entirety.

TECHNICAL FIELD

The present invention relates to a cylinder liner for use in an internal combustion engine, the liner being provided with a cylindrical body comprising an internal surface divided into at least two portions along the longitudinal/axial length thereof, each of said portions comprising specific values of roughness and predefined lengths, having the objective of reducing the wear occurring due to scuffing and to friction.

BACKGROUND

Cylinder liners for use in internal combustion engines are static components composing the structure of the engine block, providing to the assembly a closed system for the gases in expansion and promoting the thermal exchange of the heat generated in the combustion with water (wet cylinder liner) or air (dry cylinder liner) circulating around the same.

Among the objectives of the different types of liners are emphasised the maintenance of the sealing of the combustion chamber, the realisation of the thermal exchange of the heat generated within the combustion chamber with the cooling medium (water or air) and the possibility of the reutilisation of the engine block.

In the functioning thereof, an internal combustion engine admits a mixture of air/fuel into the cylinder, entering into spontaneous combustion following being compressed (Diesel engines) or by means of an ignition spark created within the combustion chamber during the compression of the mixture (alcohol and/or petrol engines).

The combustion of the gases in expansion will occur within a closed system such that part of the energy generated impels a piston of the engine downwards and, in this manner, successively, moves the crankshaft, consequently transforming the energy into movement. Thus the cylinder liners act in the functioning of the engine providing the system with the closed condition necessary to the process of energy conversion.

The growing demands in relation to internal combustion engines call for continuous enhancements in relation to the diverse components thereof and the working surfaces thereof. A precise relationship between the cylinder liners, the pistons and the piston rings leads to the improvement of the performance of the engine.

Usually, the cylinder liners for use in internal combustion engines are produced in cast iron with the addition of alloying elements to improve the mechanical and thermal properties thereof. As well as the addition of alloying elements, the liners of cast iron also require optimised working surfaces, contributing to the reduction in the consumption of oil and the recirculation of the gases, producing less particles due to the wear and permitting shorter running in times and, thus, a longer working life.

Consequently, to achieve the optimisation of the working surface of the cylinder liners honing processes are usually carried out, a machining method wherein the tool realises reciprocating and rotating movements, ensuring the cylindricity of the liner and the uniformity of the surface thereof. A honing process properly realised ensures positive effects on the wear of the piston ring, on the emission of particles, on the consumption of oil and on the friction.

Diverse techniques have been developed having the objective of obtaining better conditions of operation of the cylinder liners through varied honing processes.

A first development is revealed in the German document DE102006057111, of the present applicant, relating to a cylinder liner wherein the roughness varies along the direction of displacement of the piston in the interior thereof. More specifically, the portion near the end of the maximum travel of the piston in the direction of the head possesses a region having a first roughness, and the central region of the liner, in terms of the travel of the piston, presents a second roughness, wherein in the intermediate portion of the working surface of the liner the value of roughness is greater than that of the extremities. The focus of the said document resides solely in the specifications of values of roughness of the liner and the distribution of said roughness along the length within the interior of the liner is not specified.

The patent document DE102009010791 reveals a cylinder liner provided with a higher value of roughness at the extremities in relation to the value of roughness in the central region. However, the process utilised for the obtainment of such structures leads to the emergence of recesses having greater and lesser depth (the depth varies considerably therebetween), diminishing the potential efficacy of this solution as pockets of accumulation of lubricating oil. Again, the focus of this document resides solely in the specifications of values of roughness of the liner.

The patent document DE19605588 relates to a cylinder liner the internal surface whereof presents greater values of roughness at the extremities in relation to the second portion. But in order for this result to be achieved the honing process was utilised with certain technical parameters to treat the surface of the extremity regions, utilising different parameters in the central region. In the same manner, the focus of this document resides solely in the specifications of values of roughness of the liner.

Finally, the patent document FR2884889 relates to a cylinder liner the sliding surface whereof presents three values of roughness, being (i) a first value S1, lowest (least rough) in the portion of the extremity facing the head, in the second portion and in the portion of the opposite extremity, (ii) a second value of roughness S2 of medium roughness applied between the extremity of the portion facing the head and the second portion and, finally, (iii) a third greater value of roughness S3 applied between the second portion and the portion of the extremity opposed to that facing the head. In this case also the focus resides solely in the specifications of values of roughness of the liner.

In this manner it may be observed that in the state of the art there exist diverse technologies applied to the processes of honing for cylinder liners, having the particular objective of specifications of values of roughness along the length of displacement of the piston within the interior thereof.

However, documents are not found demonstrating, in addition to the magnitude of the values of roughness, the ratio of length in terms of variation of the roughnesses obtained in different defined portions of the working surface of the liners.

Having a view to reducing wear through friction and scuffing during the operation of the engine, a cylinder liner for an internal combustion engine is presented provided with a hollow cylindrical body comprising an internal working surface provided with a longitudinal/axial length and divided into at least two portions along the longitudinal length thereof, each of said portions comprising a specific value of roughness and a predefined length over an established interval.

SUMMARY

A first object of the present invention is to provide a cylinder liner for use in an internal combustion engine provided with a cylindrical body comprising an internal surface presenting specific values of roughness and predefined lengths in accordance with a division of portions of the surface, said values ensuring positive effects on the wear of the liner in contact with a piston ring, on the emission of particles, on the consumption of oil, on the friction and, consequently, on the working life of the engine.

In particular, the present invention has as object provision of a cylinder liner comprising the internal surface thereof divided into three portions having specific roughnesses, being a first portion, a second portion and a third portion, such that the lengths occupied by each of said portions are predefined at established intervals, having a view to reducing the wear suffered through scuffing, in particular in the first and third portions, and reducing the wear suffered through friction in the second portion.

The objects of the present invention are achieved by a cylinder liner for an internal combustion engine provided with a hollow cylindrical body comprising an internal surface having a longitudinal/axial length, the internal surface being divided into at least two portions along the longitudinal/axial length thereof, each of the portions comprising a specific value of roughness and a predefined length.

The objects of the present invention are also achieved by a cylinder liner comprising the internal surface divided into three portions along the longitudinal/axial length thereof, being (i) a first portion near the end of the limit of the stroke of displacement of a piston, facing the head of the engine, proximate to the top dead centre (TDC) thereof, (ii) a second central portion, (iii) a third portion near the end of the limit of the stroke of displacement of the piston, facing the crankshaft of the engine, proximate to the bottom dead centre (BDC) thereof, each of the portions comprising a specific value of roughness and a predefined length, the predefined lengths being established such that (1) the ratio between the sum of the lengths of the first portion (Z1) and of the third portion (Z3), and the longitudinal/axial length (L) of the cylinder liner (1) shall be greater than 0.31 and less than 0.58 ($0.31<(Z1+Z3)/L<0.58$) and (2) the ratio between the lengths of the first portion (Z1) and of the second portion (Z2) shall be greater than 0.15 and less than 0.46 ($0.15<Z1/Z2<0.46$).

Additionally, the objects of the present invention are achieved by a cylinder liner comprising a constant angle of honing along the entire longitudinal/axial length thereof, comprising a specific angle of honing for each of the portions thereof.

Furthermore, the objects of the present invention are achieved by a cylinder liner having the first portion comprising values of roughness of up to 0.30 Rpk, between 0.40 and 1.50 Rk, and between 1.10 and 2.80 Rvk, the second portion comprising values of roughness of up to 0.30 Rpk, up to 0.40 Rk, and between 0.30 and 1.00 Rvk, and the third portion comprising values of roughness of up to 0.30 Rpk, up to 1.50 Rk, and between 0.30 and 2.80 Rvk.

BRIEF DESCRIPTION OF THE DRAWINGS

The present invention will be described in greater detail hereinafter on the basis of an example of embodiment represented in the drawings. The figures show.

DETAILED DESCRIPTION

The present invention relates to a cylinder liner 1 for use in an internal combustion engine provided with a hollow cylindrical body 2, comprising an internal surface 4 of contact with a piston ring defining three principal portions, being a first portion Z1, a second portion Z2 and a third portion Z3, the internal surface 4 presenting specific values of roughness for each of the portions Z1, Z2, Z3 thereof, such that the lengths occupied by each of the portions Z1, Z2, Z3 are established at predefined intervals, having the objective of optimising the ratios between the lengths of the portions Z1, Z2, Z3 of the internal surface 4 for the reduction of wear through scuffing and through friction.

As aforementioned, cylinder liners for use in internal combustion engines are static components composing the structure of the engine block, providing to the assembly a closed system for the gases in expansion and promoting the thermal exchange of the heat generated in the combustion with water (wet cylinder liner) or air (dry cylinder liner) circulating around the same.

Figure 1:
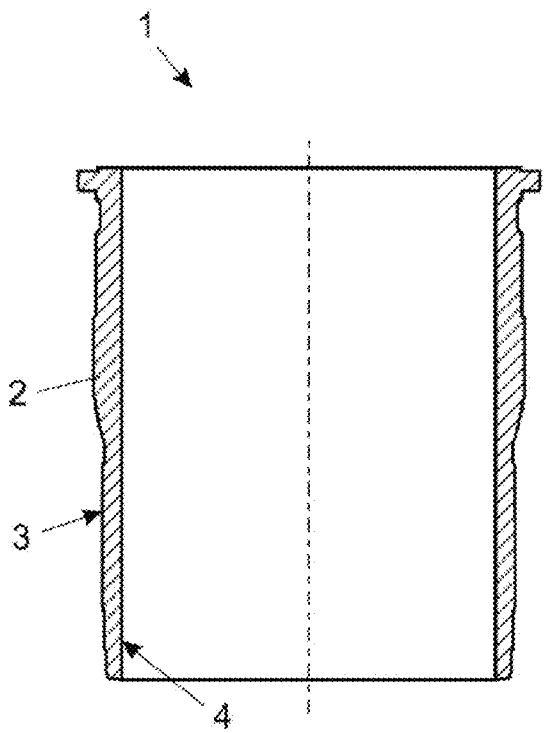
FIG. 1, a cross-sectional view of a cylinder liner indicating the constituent parts thereof.

The cylinder liners 1 are, basically, provided with a tube or hollow/through cylindrical body 2 comprising an external surface 3 of contact with a cooling fluid, whether this fluid be water or air, and an internal surface 4 of contact with at least one piston ring, wherein occurs the axial displacement of a piston. This constructional configuration may be observed in FIG. 1 of the present application.

Usually, the cylinder liners 1 are produced in ferrous alloys, cast iron or steel, and may comprise other necessary or desirable materials (such as aluminium alloys) in the manufacture thereof. Analogously, the liners 1 may present any necessary or desirable format on condition of being functional.

One of the conditions required for a correct functioning of the internal combustion engines is the obtainment of a precise relationship between the cylinder liners 1, the pistons and the piston rings, said functioning leading to the improvement in the performance of the engine. For this reason, the cylinder liners 1 require optimised working surfaces, the principal contribution whereof is an increase in the working life of the engines.

Consequently, to achieve the optimisation of the internal working surface 4 of the cylinder liners 1, honing processes are usually realised having as an objective the removal of machining irregularities, providing the liner 1 with a uniform final finish having controlled angles of processing and values of roughness. A properly realised honing process ensures positive effects on the wear of the piston ring, on the emission of particles, on the consumption of oil and on the friction.

Some solutions of the prior art have recourse to distinct surface finishing processes to achieve different standards of roughness along the liner 1; however, the present invention utilises honing and controls the process variations such that substantially different values of roughness are obtained upon the internal surface 4, in addition to ensuring the control of the angle of the grooves inherent in this type of process.

In a first constructional configuration, the internal surface 4 of the cylinder liner 1 comprises a longitudinal/axial length L, the internal surface 4 being divided into at least two portions Z1, Z2 along the length of the longitudinal/axial length L thereof, each of the portions Z1, Z2 comprising a specific value of roughness and a predefined length.

Figure 2:
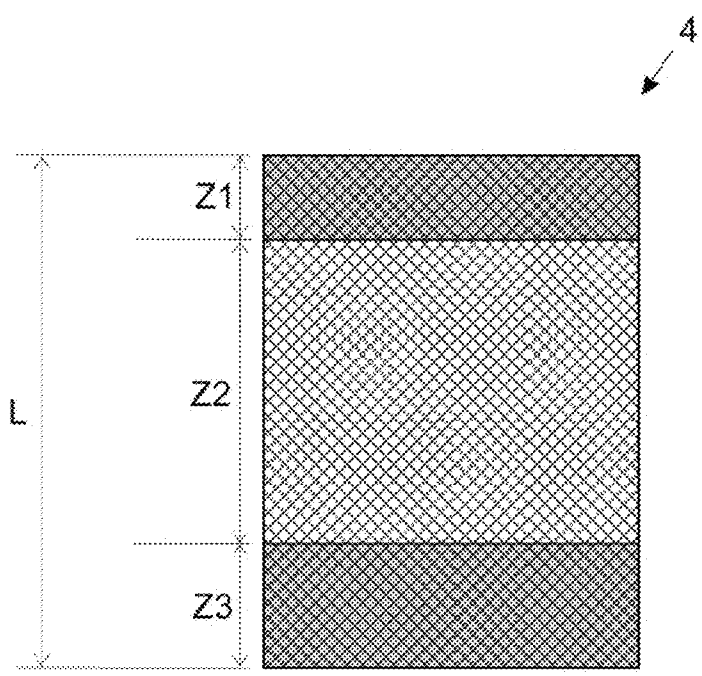
FIG. 2, a schematic view of the cylinder liner of the present invention, representing the roughnesses of the internal surface thereof.

In a preferential constructional configuration, the internal surface 4 of the cylinder liner 1 comprises a longitudinal/axial length L, being divided into three portions along the longitudinal/axial length L thereof, clearly identified in FIG. 2, being:

(i) a first portion Z1, corresponding to the region near the end of the limit of the stroke of displacement of the piston facing the head of the engine (top dead centre, TDC);

(ii) a second central portion Z2; and (iii) a third portion Z3, corresponding to the region near the end of the limit of the stroke of displacement of the piston, being however opposed (facing the crankshaft of the engine, bottom dead centre, BDC).

There exist in the state of the art diverse technologies presenting each of the portions Z1, Z2, Z3 of the internal surface 4 of the liner 1 comprising specific values of roughness and angles of honing. This division of the internal surface 4 into portions Z1, Z2, Z3 having distinct roughnesses and processes is highly advantageous by virtue of the fact that it permits controlling and reducing wear occurring in the contact of the liner 1 with a piston ring.

In this manner, whatever the specification of the liner 1 may be, and considering the three portions Z1, Z2, Z3 defined upon the internal surface 4, the configuration thereof will be such that:

(a) the first portion Z1 presents a surface finish having a first value of roughness defined by a structure of recesses and projections (valleys and peaks);

(b) the second portion Z2 presents a surface finish having a second value of roughness defined by a structure of recesses and projections (valleys and peaks); and (c) the third portion Z3 presents a surface finish having a third value of roughness defined by a structure of recesses and projections (valleys and peaks).

A further characteristic of the liner 1, object of the present invention, is the control of the process of honing thereof in each of the portions Z1, Z2, Z3, such as to ensure that the structure of the recesses and projections (valleys and peaks) of each thereof is substantially uniform across the entire area whereupon it is distributed. In this manner it is ensured, in terms of the recesses, that the depth and volume presented thereby are ideal for the storage of lubricating oil and, in terms of the projections, it achieves the prevention of very high projections which increase the running-in period of the engine, in addition to leading to an undesirable increase in fuel consumption and rise in temperature.

The table below presents a preferential embodiment for the liner 1 object of the present invention:

| | Roughness [μm] | | |
|---|---|---|---|
| | First portion Z1 | Second portion Z2 | Third portion Z3 |
| Rpk | 0.30 (max.) | 0.30 (max.) | 0.30 (max.) |
| Rk | 0.40 to 1.50 | 0.40 (max.) | 1.50 (max.) |
| Rvk | 1.10 to 2.80 | 0.30 to 1.00 | 0.30 to 2.80 |

In this manner, the preferential embodiment of the present invention presents the following values in micrometers:

(1) the roughness of the first portion Z1 comprises values of up to 0.30 Rpk, between 0.40 and 1.50 Rk, and between 1.10 and 2.80 Rvk.

(2) the roughness of the second portion Z2 comprises values of up to 0.30 Rpk, up to 0.40 Rk, and between 0.30 and 1.00 Rvk.

(3) the roughness of the third portion Z3 comprises values of up to 0.30 Rpk, up to 1.50 Rk, and between 0.30 and 2.80 Rvk.

Furthermore, the liner 1 in the preferential embodiment thereof comprises a relationship of the angle of honing to be modified according to the variation in roughness presented. In a first possible configuration, the angle of honing is constant along the entire longitudinal/axial length L of the lining 1, that is to say the first portion Z1, the second portion Z2 and the third portion Z3 present the same angle of honing (angle of honing=Z1=Z2=Z3).

In a second possible configuration, the angle of honing varies between the first portion Z1, the second portion Z2 and the third portion Z3, the angle of honing of the first portion Z1 being equal to the angle of honing of the third portion Z3, varying in relation to the angle of honing of the second portion Z2 (angle of honing=Z1=Z3≠Z2 or Z1≠Z2=Z3). The typical angles for the angles of honing of the portions Z1, Z2, Z3 range from 30° to 60° and 120° to 160°, according to the application of the engine and the viscosity of the oil utilised.

In addition to the characteristics presented, the cylinder liner 1 of the present invention comprises an innovative constructional configuration insofar as, in addition to controlling the values of roughness and defining the relationship of the angles of honing, it propounds furthermore that the lengths occupied by each of the portions Z1, Z2, Z3 be defined at predefined intervals, having the objective of reduction of wear through scuffing, occurring in particular in the first portion Z1 and in the third portion Z3, and the reduction of the wear through friction, occurring in the second portion Z2.

In the state of the art, the lengths and the areas occupied by each of the portions Z1, Z2, Z3 may vary freely according to the stroke of the piston, diameter and longitudinal/axial length L of the liner 1, inter alia other variables.

In this sense, the present application presents a cylinder liner 1 comprising, upon the internal surface 4 thereof, each of the portions Z1, Z2, Z3 occupying lengths defined at predefined intervals, such that:

(I) the ratio between the sum of the lengths of the first portion Z1 and of the third portion Z3, and the longitudinal/axial length L of the cylinder liner 1 shall be greater than 0.31 and less than 0.58, consequently:

$$0.31<(Z1+Z3)/L<0.58;$$

(II) the ratio between the lengths of the first portion Z1 and of the second portion Z2 shall be greater than 0.15 and less than 0.46, consequently:

$$0.15<Z1/Z2<0.46.$$

In this manner, optimised ratios are obtained between the first portion Z1 and the third portion Z3 to increase the scuffing resistance, and between the first portion Z1 and the second portion Z2 to increase the friction resistance.

In an alternative configuration, the internal surface 4 of the cylinder liner 1 is divided into 2 or 3 or 4 or 5 or 6 or more portions along the longitudinal/axial length L thereof, each of the 2 up to 6 or more portions comprising a specific value of roughness and a predefined length in a manner analogous to that established for the preferential configuration thereof.

Figure 3:
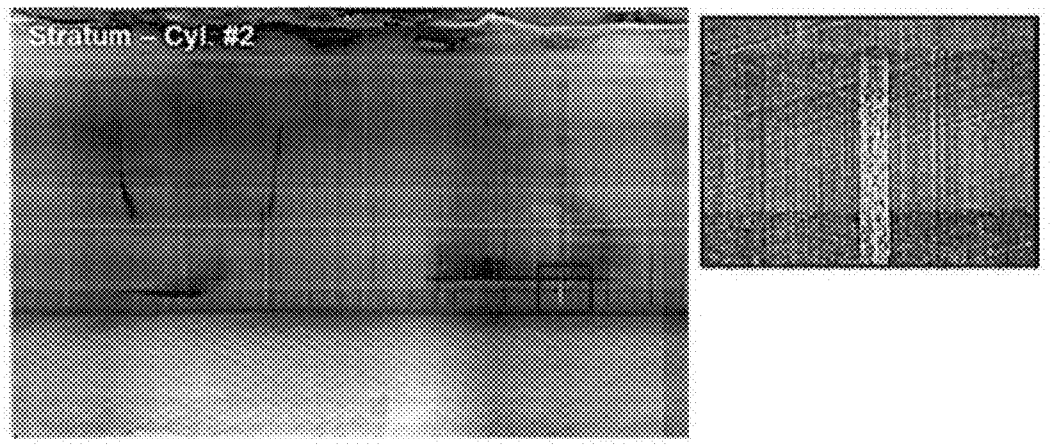
FIG. 3, a photograph of the internal surface of a cylinder liner presenting scoring and commencement of scuffing wear.

The intervals of values to define the lengths of the portions Z1, Z2, Z3 have been obtained by means of the realisation of tests on varied engines. In one of the tests realised it was possible to observe that internal surfaces 4 of liners 1 having lengths of the portions Z1, Z2, Z3 defined outside the intervals of values established (Z1+Z3)/L=0.27 and/or Z1/Z2=0.18 present strong scoring and a beginning of wear with scuffing. FIG. 3 illustrates a cylinder liner 1 having wear marks.

In addition to the advantages of increase in the wear resistance of the cylinder liner 1, the improvement of the internal surface 4 of the liner 1 of the present invention also permits that parameters such as the tangential force exerted by a piston ring assembly may be adjusted by up to 0.6 N/mm (Newtons per millimeter), reducing the friction of the liner/ring assembly during the operation of the engine.

Furthermore, the optimisation of the internal surface 4 of liner 1 also permits the adjustment of parameters such as folded material area (folded metal area, FMA) and folded material volume (folded metal volume, FMV), important for the elimination of wear through scuffing.

Figure 4:
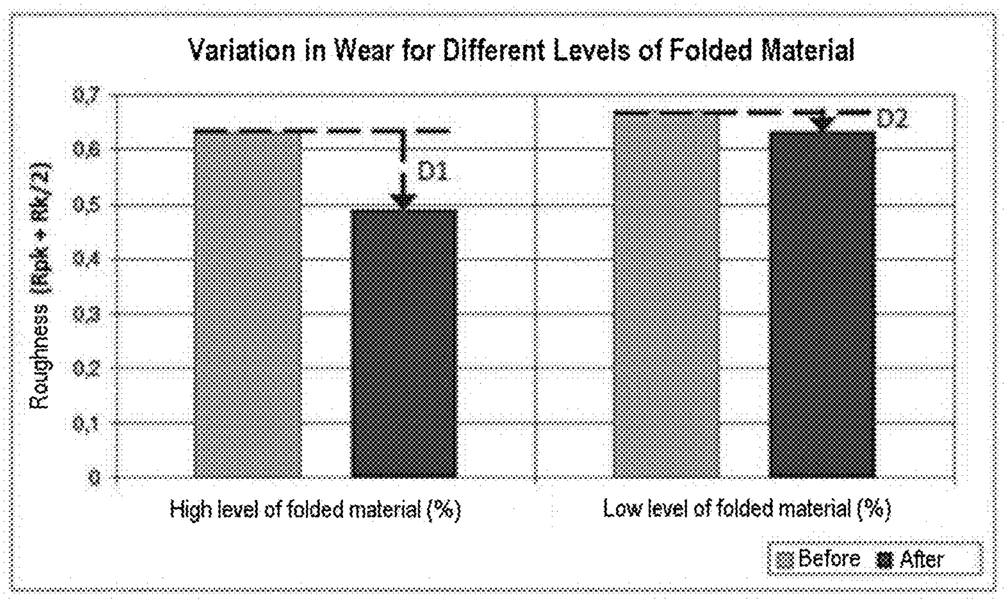
FIG. 4, a graphic representation of a variation of wear for different levels of folded material (FMA/FMV).

The smaller the parameters FMA and FMV the better will be the fluidity of the oil between the granulations of the material, in this manner promoting better lubrication of the assembly and, consequently, reducing the wear. In this case, values of FMA of up to 10% (maximum) and of FMV of up to 50 000 μm3/mm2 (cubic micrometers per square millimeter) were obtained. The graphic represented in FIG. 4 of the present application has been obtained from 100 hour engine tests and demonstrates the variation of wear for different levels of folded material (FMA/FMV). It may be observed that for high levels of folded material the cylinder liner 1 presented wear D1 of approximately 0.14 micrometers, whilst for low levels of folded material the wear D2 was significantly reduced, being approximately 0.04 micrometers. In this sense, the greater the level of wear D1, D2 of the liner 1 the lower the scuffing resistance, by virtue of the lower fluidity of the oil within the honing grooves of the internal surface 4 of the cylinder liner 1.

An example of preferred embodiment having been described, it shall be understood that the scope of the present invention covers other possible variations being limited solely by the content of the claims appended, therein included the possible equivalents.

The invention claimed is:

1. A cylinder liner for an internal combustion engine, comprising:
- a hollow cylindrical body with an internal surface having a longitudinal/axial length, the internal surface divided into at least two portions along the longitudinal/axial length;
- wherein the at least two portions comprises a first portion and a second portion;
- wherein the at least two portions respectively include a specific value of roughness and a predefined length;
- wherein the specific value of roughness of the first portion includes values of up to 0.30 Rpk, between 0.40 and 1.50 Rk, and between 1.10 and 2.80 Rvk; and
- wherein the specific value of roughness of the second portion includes values of up to 0.30 Rpk, up to 0.40 Rk, and between 0.30 and 1.00 Rvk.

2. The cylinder liner according to claim 1, wherein the internal surface is divided into at least three portions along the longitudinal/axial length, the at least three portions including:
- the first portion disposed in a region corresponding to a position of an end of the limit of a stroke of displacement of a piston facing a head of the engine, proximate to a top dead centre;
- the second portion; and
- a third portion disposed in a region corresponding to a position of an end of the limit of the stroke of displacement of a piston facing a crankshaft of the engine, proximate to a bottom dead centre;
- wherein the second portion is disposed between the first portion and the second portion; and
- wherein the at least three portions include a respective specific value of roughness and a respective predefined length.

3. The cylinder liner according to claim 2, wherein the respective predefined length of the at least three portions are defined such that:
- a first ratio between (i) a sum of a length of the first portion and of the third portion, and (ii) the longitudinal/axial length of the cylinder liner, is greater than 0.31 and less than 0.58; and
- a second ratio between a length of the first portion and of the second portion is greater than 0.15 and less than 0.46.

4. The cylinder liner according to claim 1, wherein the internal surface further includes a constant angle of honing along the longitudinal/axial length.

5. The cylinder liner according to claim 1, wherein the internal surface further includes a specific angle of honing for each of the at least two portions.

6. The cylinder liner according to claim 2, wherein the respective specific value of roughness of the third portion includes values of up to 0.30 Rpk, up to 1.50 Rk, and between 0.30 and 2.80 Rvk.

7. The cylinder liner according to claim 6, wherein the respective specific value of roughness of the first portion includes values of up to 0.30 Rpk, between 0.40 and 1.50 Rk, and between 1.10 and 2.80 Rvk.

8. The cylinder liner according to claim 7, wherein the respective specific value of roughness of the second portion includes values of up to 0.30 Rpk, up to 0.40 Rk, and between 0.30 and 1.00 Rvk.

9. The cylinder liner according to claim 1, wherein the at least two portions of the internal surface includes a first portion and a second portion, the first portion disposed proximate to a region corresponding to a top dead centre position of a piston stroke in relation to the second portion.

10. The cylinder liner according to claim 9, wherein the specific value of roughness of the first portion includes values of at least one of up to 0.30 Rpk, between 0.40 and 1.50 Rk, and between 1.10 and 2.80 Rvk.

11. The cylinder liner according to claim 9, wherein the specific value of roughness of the second portion includes values of at least one of up to 0.30 Rpk, up to 0.40 Rk, and between 0.30 and 1.00 Rvk.

12. The cylinder liner according to claim 9, wherein the at least two portions of the internal surface further includes a third portion disposed proximate to a region corresponding to a bottom dead centre of the piston stroke in relation to the first portion, and the second portion is disposed between the first portion and the third portion, and wherein the specific value of roughness of the third portion includes values of at least one of up to 0.30 Rpk, up to 1.50 Rk, and between 0.30 and 2.80 Rvk.

13. The cylinder liner according to claim 9, wherein the at least two portions include a specific angle of honing along the longitudinal/axial length, and wherein the specific angle of honing of the first portion is different from the specific angle of honing of the second portion.

14. A cylinder liner for an internal combustion engine, comprising:

a hollow cylindrical body defining an internal surface having a longitudinal/axial length, the internal surface including a plurality of portions divided along the longitudinal/axial length, the plurality of portions including:

a first portion disposed proximate to a region corresponding to a top dead centre position of a piston stroke, the first portion having a first specific value of roughness and a first predefined length;

a second intermediate portion having a second specific value of roughness and a second predefined length; and a third portion disposed remote to the region corresponding to the top dead centre position in relation to the first portion and the second intermediate portion, the third portion including a third specific value of roughness and a third predefined length;

wherein the first specific value of roughness differs from at least one of the second specific value of roughness and the third specific value of roughness;

wherein the first specific value of roughness of the first portion includes values of up to 0.30 Rpk, between 0.40 and 1.50 Rk, and between 1.10 and 2.80 Rvk; and wherein the second specific value of roughness of the second portion includes values of up to 0.30 Rpk, up to 0.40 Rk, and between 0.30 and 1.00 Rvk.

15. The cylinder liner according to claim 14, wherein the plurality of portions defines a relationship such that:

a first ratio between (i) a sum of the first predefined length of the first portion and the third predefined length of the third portion, and (ii) the longitudinal/axial length of the internal surface, is greater than 0.31 and less than 0.58; and a second ratio between the first predefined length of the first portion and the second predefined length of the second portion is greater than 0.15 and less than 0.46.

16. The cylinder liner according to claim 14, wherein the second intermediate portion and one of the first portion and third portion further include a constant angle of honing therealong.

17. The cylinder liner according to claim 16, wherein the internal surface further includes a constant angle of honing along an entirety of the longitudinal/axial length.

18. The cylinder liner according to claim 14, wherein the third specific value of roughness of the third portion includes values of up to 0.30 Rpk, up to 1.50 Rk, and between 0.30 and 2.80 Rvk.

* * * * *